(No Model.)
W. N. WHITELEY & W. BAYLEY.
HARVESTER.
No. 306,448. Patented Oct. 14, 1884.
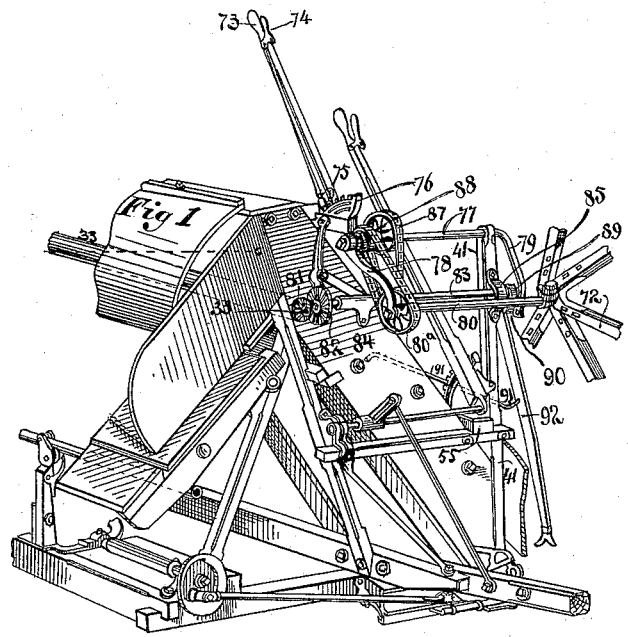
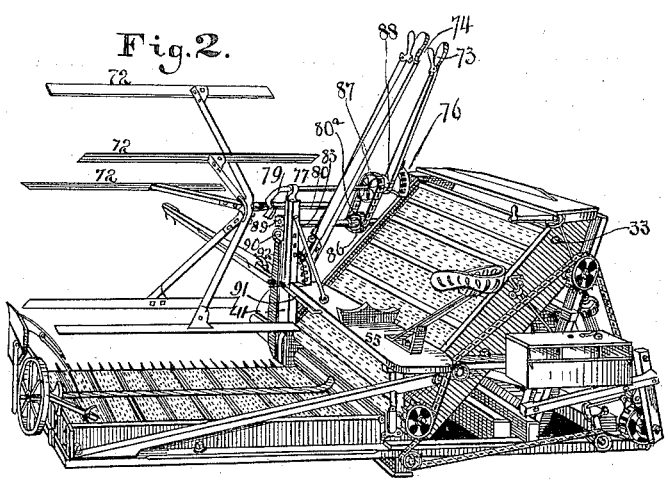

UNITED STATES PATENT OFFICE.

WILLIAM N. WHITELEY AND WILLIAM BAYLEY, OF SPRINGFIELD, OHIO.

HARVESTER.

SPECIFICATION forming part of Letters Patent No. 306,448, dated October 14, 1884.

Application filed May 23, 1882. (No model.) Patented in Canada March 24, 1882, No. 14,483.

*To all whom it may concern:*

Be it known that we, WILLIAM N. WHITELEY and WILLIAM BAYLEY, of Springfield, in the county of Clark and State of Ohio, have invented new and useful Improvements in Harvesters; and we do hereby declare that the following is a full and accurate description of the same.

This invention forms a part of that for which an application for Letters Patent was filed on the 30th of January, 1882, Serial No. 51,562, and has been separated therefrom. This specification, therefore, includes matters originally shown and described in said application; but the portion intended to be claimed herein has exclusive reference to the reel and butt-rake of the harvester.

This invention therefore consists in a reel supported upon crank-arms with a long pipe-box driven by sprocket-wheels and chain belts, and a supplemental or butt rake driven in conjunction with said reel by the same shaft-gearing.

That others may fully understand our invention we will more particularly describe it, having reference to the accompanying drawings, wherein—

Figure 1 is a perspective view of our invention, looking from the front; and Fig. 2 is a perspective view of the same, looking from the rear.

The reel 72 is constructed with laterally-projecting beaters, and may be adjusted high or low to suit the varying conditions of the grain and assist in its proper delivery to the sickle and conveyer-belt. Said adjustment is made by a lever, 73, provided with a spring-detent, 75, controlled by a bell-crank, 74. This spring-detent 75 engages with a toothed sector-piece, 76, that is firmly secured to the elevator-frame in a suitable manner to permit said detent to engage with any one of its teeth for the purpose of raising or lowering the reel. The lever 73 is securely fixed to a rock-shaft, 77, journaled in the sector-piece 76 at one end and to the upright 41 at the other end. The rock-shaft 77 is provided with two parallel crank-arms, 78 and 79, one of which, 79, is formed by bending the shaft 77, and the other is attached to said shaft by a spline and a retaining-nut.

To the ends of the cranks 78 and 79 we attach a pipe-box, 80, that forms a long journal-bearing for the shaft that operates the reel, and to one end of which shaft the reel is firmly secured. The reel-shaft that works through the pipe-box 80 is driven through the agency of a bevel-pinion, 81, gearing into a bevel-wheel, 82. The pinion 81 is mounted upon and derives its motion from the upper roller, 33, of the elevator, and the bevel-wheel 82, with which it gears, is fast upon a shaft, 83, journaled at one end in a bracketed journal-box, 84, that is bolted to the elevator-frame, and journaled at its other end in a strap journal-box, 85, bolted to the upright 41.

Fast upon the shaft 83 is a small sprocket-wheel, 86, and upon the rock-shaft 77 is a larger sprocket-wheel, 87, said sprocket-wheels being connected by a chain.

Upon the shaft 77 there is a small sprocket-wheel, 88, that by means of a chain communicates motion to a larger sprocket-wheel, 80$^a$, fast upon the reel-shaft. The sprocket-wheels 87 and 88 are joined together and run loosely upon the shaft 77.

By means of a gear-wheel, 89, fast to the shaft 83, meshing into a crank gear-wheel, 90, journaled in the aforesaid journal-box 85, aided by a radius-rod, 91, that is pivoted to the seat-board 55 and to a relief-rake or butt-rake, 92, we are enabled to move the grain backward and upward from the heel of the sickle to within the range of the conveyer.

Matters shown in the drawings, but not claimed, are claimed in our applications Serial numbers 51,562 and 62,197, filed of even date herewith.

Having described our invention, what we claim as new is—

1. The reel 72, the reel-shaft, and the rock-shaft 77, bearing the reel, supporting crank-arms 78 and 79, combined with the shaft 83, pinions 81 and 82, the upper roller, 33, of the elevator, the long pipe-box 80, supported at the ends of said crank-arms 78 and 79, the sprocket-wheels 86, 87, 88, and 80$^a$, and the driving-chains, whereby the reel and auxiliary rake are driven by motion derived from the upper roller of the elevator.

2. The upper roller of the elevator, provided with a driving-pinion, 81, the shaft 83, pinion 82, and gear-wheel 89, driven by said roller, combined with the crank gear-wheel 90, journaled in box 85, the radius-rod 91, pivoted to the seat-board 55, and the relief-rake 92, whereby we are enabled to move the grain backward and upward from the heel of the sickle into the range of the conveyer.

W. N. WHITELEY.
WILLIAM BAYLEY.

Witnesses:
F. B. FURNISS,
W. T. STILWELL.